United States Patent
Tsai (10) Patent No.: US 10,306,450 B2
(45) Date of Patent: May 28, 2019

(54) PROXIMITY REQUEST VALIDATING METHOD, USER EQUIPMENT USING THE SAME, IDENTITY REQUEST METHOD, AND NETWORK ENTITY USING THE SAME

(71) Applicant: Acer Incorporated, New Taipei (TW)

(72) Inventor: Wei-Chieh Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 561 days.

(21) Appl. No.: 14/794,814

(22) Filed: Jul. 9, 2015

(65) Prior Publication Data

US 2016/0205530 A1    Jul. 14, 2016

Related U.S. Application Data (60) Provisional application No. 62/101,380, filed on Jan. 9, 2015.

(51) Int. Cl.
*H04W 8/00* (2009.01)
*H04W 12/08* (2009.01)
*H04W 4/80* (2018.01)

(52) U.S. Cl.
CPC ............ *H04W 8/005* (2013.01); *H04W 4/80* (2018.02); *H04W 12/08* (2013.01)

(58) Field of Classification Search
CPC combination set(s) only.
See application file for complete search history.

(56) References Cited

U.S. PATENT DOCUMENTS 8,594,632 B1    11/2013  Azizi et al.
2013/0331097 A1*  12/2013  Kang .................... H04W 48/16
                                                       455/434

(Continued)

FOREIGN PATENT DOCUMENTS

CN        104066070       9/2014
EP         2978247        1/2016

(Continued)

OTHER PUBLICATIONS

3rd Generation Partnership Project; Technical Specification Group Core Network and Terminals; Proximity-services (ProSe) User Equipment (UE) to Proximityservices (ProSe) Function Protocol aspects; Stage 3 (Release 12), 3GPP TS 24.334, V1.1.0, Jul. 2014, pp. 1-59.*

(Continued)

*Primary Examiner* — Nay A Maung
*Assistant Examiner* — Erica L Fleming-Hall
(74) *Attorney, Agent, or Firm* — JCIPRNET (57) ABSTRACT

The disclosure proposes a proximity request validating method, a UE using the same method, an identity request method, and a network entity using the same method. In one of the exemplary embodiments, a UE may receive a proximity request validation message of a D2D discovery using the transceiver module, wherein the proximity request validation message comprises an application layer user ID of a discoverer and a validating response indicator. The UE may then transmits a proximity request validation response message in response to the proximity request validation message using the transceiver module according to a validating operation in response to receiving the validating operation, and transmits the proximity request validation response message using the transceiver module according to the validating response indicator in response to the validating operation is not received.

14 Claims, 8 Drawing Sheets

(56) References Cited

U.S. PATENT DOCUMENTS

| | | | |
|---|---|---|---|
| 2014/0106707 A1 | 4/2014 | Bontu et al. | |
| 2014/0341121 A1* | 11/2014 | Chang | H04W 8/005 370/329 |
| 2014/0342735 A1* | 11/2014 | Liao | H04W 8/04 455/435.1 |
| 2014/0344578 A1* | 11/2014 | Kim | H04L 63/0428 713/168 |
| 2014/0378123 A1* | 12/2014 | Stojanovski | H04W 52/0251 455/422.1 |
| 2015/0282108 A1* | 10/2015 | Kiss | H04L 65/1006 455/435.1 |
| 2015/0289127 A1* | 10/2015 | Ou | H04W 8/005 455/426.1 |
| 2016/0050703 A1* | 2/2016 | Johnsson | H04W 8/005 370/329 |
| 2016/0127965 A1* | 5/2016 | Liao | H04W 4/008 370/331 |
| 2016/0157056 A1* | 6/2016 | Kim | H04W 4/023 455/414.1 |
| 2016/0205710 A1* | 7/2016 | Tsai | H04W 8/005 370/329 |
| 2017/0094457 A1* | 3/2017 | Lee | H04W 4/02 |
| 2018/0007497 A1* | 1/2018 | Ahmad | H04W 4/005 |

FOREIGN PATENT DOCUMENTS

| | | |
|---|---|---|
| TW | 201404235 | 1/2014 |
| TW | 201424441 | 6/2014 |
| TW | 201446041 | 12/2014 |
| WO | 2014146474 | 9/2014 |
| WO | 2014210250 | 12/2014 |

OTHER PUBLICATIONS

3GPP, "Technical Specification Group Core Network and Terminals; Proximity-services (ProSe) User Equipment (UE) to ProSe function protocol aspects; Stage 3 (Release 12)," 3GPP TS 24.334, Jan. 2015, pp. 1-67.

"3rd Generation Partnership Project; Technical Specification Group Services and System Aspects; Proximity-based services (ProSe); Stage 2 (Release 12)," 3GPP TS 23.303, V12.1.0, Jun. 2014, pp. 1-60.

3GPP, "3rd Generation Partnership Project; Technical Specification Group Core Network and Terminals; Proximity-services (ProSe) User Equipment (UE) to ProSe function protocol aspects; Stage 3 (Release 12)" 3GPP TS 24.334 V12.1.1, Jan. 6, 2016, pp. 15, 16, 24, 25, 28, 29, 36, 37.

* cited by examiner

PROXIMITY REQUEST VALIDATING METHOD, USER EQUIPMENT USING THE SAME, IDENTITY REQUEST METHOD, AND NETWORK ENTITY USING THE SAME

CROSS REFERENCE TO RELATED APPLICATION

This application claims the priority benefit of U.S. provisional application Ser. No. 62/101,380, filed on Jan. 9, 2015. The entirety of the above-mentioned patent application is hereby incorporated by reference herein and made a part of specification.

BACKGROUND OF THE DISCLOSURE

1. Field of the Disclosure

The disclosure generally relates to a proximity request validating method, a UE using the same method, an identity request method, and a network entity using the same method.

2. Description of Related Art

In the field of D2D communication which is often referred to as a Proximity-based Services (ProSe) communication, a UE typically may directly discover another UE and subsequently perform D2D communication with another UE with or without the assistance of a core network such as an Evolved Packet Core (EPC). In a proximity discovery procedure, a ProSe-enabled UE may transmit a proximity request in order to discovering another ProSe-enabled UE are described in 3GPP TS 23.303 which is incorporated by reference herein. When the proximity discovery procedure occurs in the EPC-level, the proximity discovery procedure would involve a proximity request validation procedure by which a network entity such as a ProSe function in the EPC network would ask the a targeted UE to confirm a permission for the proximity request if a profile of the targeted UE indicates that the proximity request need to be explicitly validated described in 3GPP TS 24.334 which is incorporated by reference herein. The ProSe Function is the logical function that is used for network related actions required for ProSe. The ProSe Function plays different roles for each of the features of ProSe.

A proximity discovery procedure may involve different types of identifiers (ID). A network level user ID such as an EPC ProSe user ID (EPUID) is an identifier for EPC-level ProSe discovery and EPC support of WLAN direct communication to uniquely identify a UE registered for ProSe. This identifier could occasionally be reassigned by the ProSe Function in an EPC network. An application Layer User ID (ALUID) is an identifier that identifies a user within the context of specific application.

Figure 1:
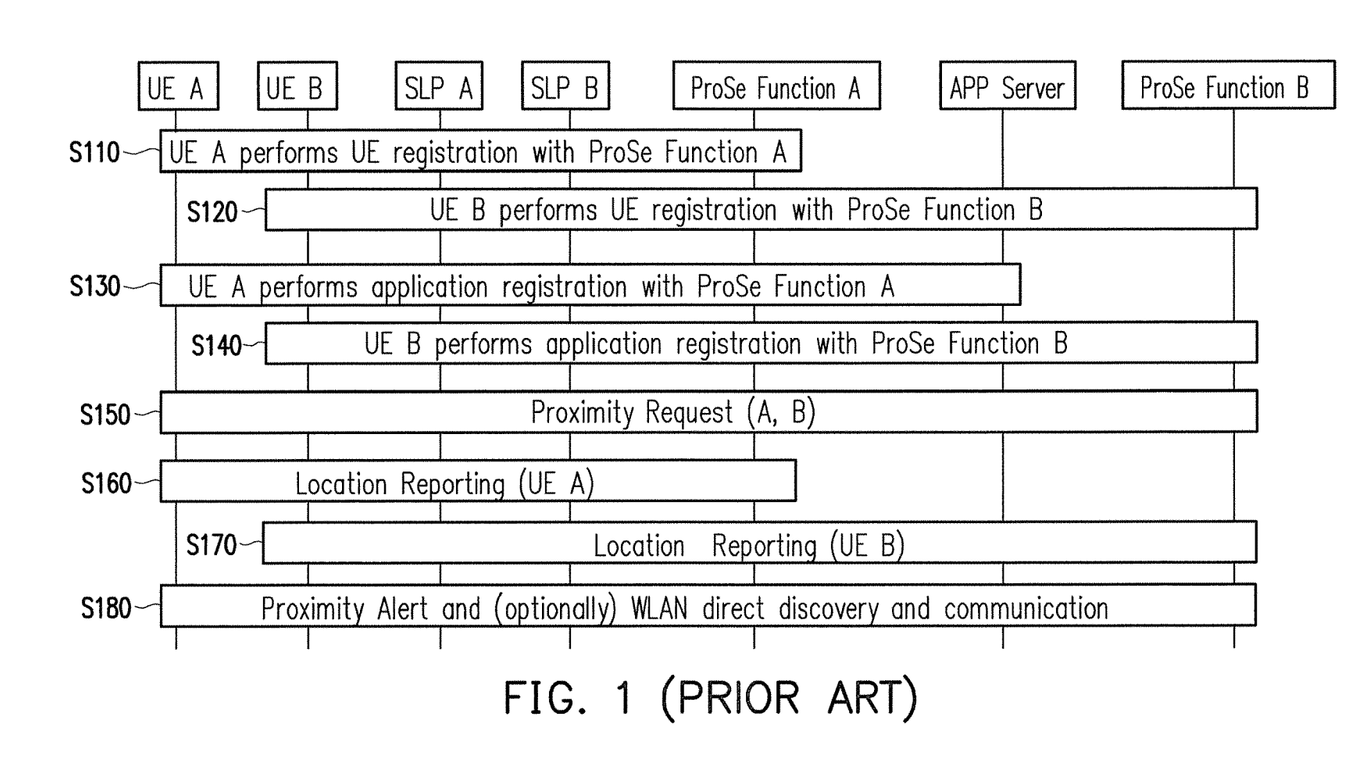
FIG. 1 shows a general call flow of EPC-level ProSe discovery.

FIG. 1 shows a general call flow of a EPC-level ProSe discovery procedure which is consistent with 3GPP TS 23.303 for example. In step S110 and S120, in order to order to obtain ProSe service, UE A and UE B would perform UE registration for ProSe or D2D communication with the ProSe Function A and ProSe Function B residing in their respective home public land mobile networks (Home PLMNs), respectively. In step S130 and S140, in order to check an authorization of the requested application the ProSe function (such as the ProSe Function A and the ProSe Function B) and request the APP server to register UE's ALPUID with an EPUID, UE A and UE B would perform application registration for ProSe with the ProSe Function A and the ProSe Function B residing in their respective Home PLMNs, respectively. In step S150, UE A would make a proximity request (to possibly indicate a window of time during which the proximity request is valid) for UE B. For example, UE A might be alerted for proximity with UE B. In response to the proximity request, ProSe Function A would request for a location update for UE A and for UE B. The location updates could be periodic or could be based on a triggered event or both. In order to request location updates for UE A, ProSe Function A would contact the SUPL Location Platform (SLP) A. Similarly, in order to request a location update for UE B, ProSe Function A would contact ProSe Function B, which would request a location update for UE B from SLP B.

In step S160 and S170, the locations of UE A and UE B could be reported to their respective ProSe Functions intermittently. ProSe Function B may forward the updates of the locations of UE B to ProSe Function A based on conditions set by ProSe Function A. Whenever ProSe Function A receives the updates of the locations of UE A and/or UE B, Prose Function A may perform proximity analysis for the locations of UE A and UE B. In step S180, when ProSe Function A detects that UE A and UE B are in proximity, ProSe Function A would informs UE A that UE B is in proximity and may optionally provide UE A with an assistance information for WLAN direct discovery and communication with UE B. Similarly, ProSe Function A would inform ProSe Function B, which in turn would inform UE B of the detected proximity of UE A. The Prose Function B may also optionally provide UE B with the assistance information for WLAN direct discovery and communication with UE A.

Figure 2:
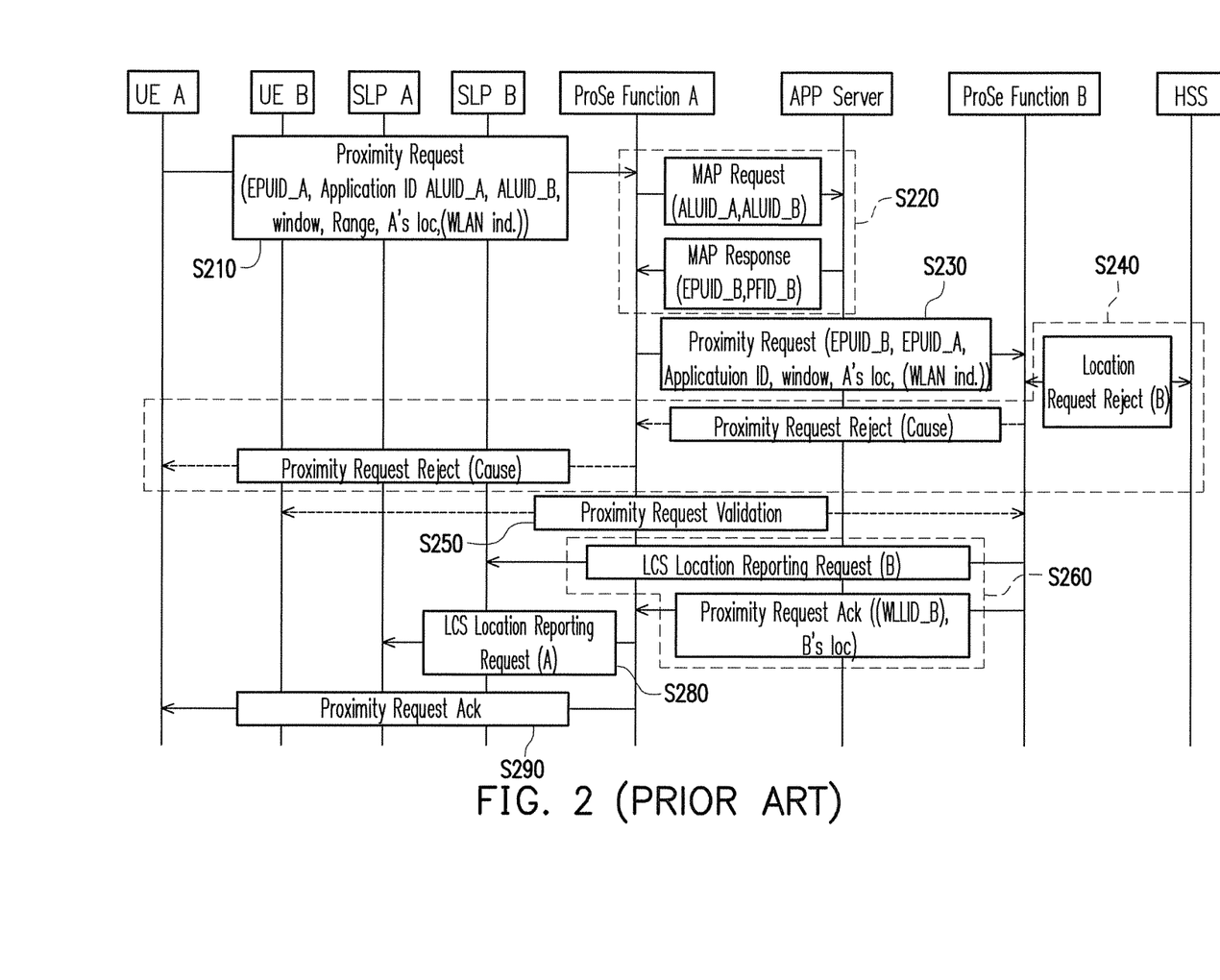
FIG. 2 is a flow chart which illustrates an example of an EPC-level proximity request procedure.

FIG. 2 is a flow chart which illustrates an example of an EPC-level proximity request procedure. In step S210, UE A sends a Proximity Request message to ProSe Function A. In response to receiving the Proximity Request message, in step S220, ProSe Function A would perform a proximity map request procedure with the APP server. The Proximity map request procedure is used for requesting the EPUID of UE B for which UE A shall get alerts when in proximity of UE B, and the identity of the ProSe Function (PFID) for UE B as well. In step S230, ProSe Function A propagates the Proximity Request message with EPUID of UE B to ProSe Function B. Based on EPUID_B received in the step S230, ProSe Function B retrieves UE B's record. In step S250, the proximity request validation procedure would be performed depending on UE B's ProSe profile, UE B may be asked to confirm permission for the proximity request. In step S260, ProSe Function B requests location reporting on UE B from SLP B and acknowledges the proximity request to ProSe Function A and provides UE B's current location (if known). In step S280, ProSe Function A requests location reporting on UE A from SLP A. If UE A's current location is available and if UE B's location was included in step S260, ProSe Function A may decide to cancel the Proximity Request procedure if it determines that the UEs are unlikely to enter proximity within the requested time window. Otherwise, ProSe Function A acknowledges the proximity request to UE A (S290). Examples of the proximity request procedure are described in 3GPP TS 23.303 and TS 24.334 which are incorporated by reference herein, and the detailed descriptions would be described later.

However, in the aforementioned EPC-level ProSe discovery procedure and the proximity request procedure, there could be two issues. The first issue is that the targeted UE such as UE B in FIG. 1 and FIG. 2 may not know who has made the proximity request. For example, as a social network application is executed on UE A in FIG. 2, and the UE A has received an operation for chatting with a friend such as a user of UE B in FIG. 2. In response to receiving the operation, UE A would send the proximity request to ProSe Function A. Then, ProSe Function A would ask UE B for validating the proximity request. However, UE B would receive a chatting request notification for accepting or rejecting to chatting without knowing the identity of UE A.

The second issue is that execution of the proximity request validation procedure might be stuck because the targeted UE does not respond to the proximity request such as by given a permission or denial for the incoming proximity request. Assuming that a user of the targeted UE is in busy or does not notice the incoming request, the proximity request validation procedure might not be able to proceed properly.

SUMMARY OF THE DISCLOSURE

Accordingly, the present disclosure is directed to a proximity request validating method, a UE using the same method, an identity request method, and a network entity using the same method.

In one of the exemplary embodiments, the present disclosure is directed to a proximity request validating method which is used by a UE and the method includes at least but not limited to receiving a proximity request validation message of the D2D discovery, wherein the proximity request validation message comprises a application layer user ID of a discoverer and a validating response indicator, transmitting a proximity request validation response message in response to the proximity request validation message according to a validating operation in response to receiving the validating operation, and transmitting the proximity request validation response message according to the validating response indicator in response to the validating operation is not received.

In one of the exemplary embodiments, the present disclosure is directed to a UE, including at least but not limited to a transceiver module and a processing module coupled to the transceiver module. The transceiver is configured for transmitting and receiving wireless data. The processing module is configured for at least but not limited to receiving a proximity request validation message of a D2D discovery using the transceiver module, wherein the proximity request validation message comprises a application layer user ID of a discoverer and a validating response indicator, transmitting a proximity request validation response message in response to the proximity request validation message using the transceiver module according to a validating operation in response to receiving the validating operation, and transmitting the proximity request validation response message using the transceiver module according to the validating response indicator in response to the validating operation is not received.

In one of the exemplary embodiments, the present disclosure is directed to an identity request method which is used by a network entity and the method includes at least but not limited to transmitting an identity request message comprising a network level user ID of a discoverer, receiving an identity response message comprising an application layer user ID of the discoverer corresponding to the network level user ID of the discoverer, transmitting a proximity request validation message of a D2D discovery comprising the application layer user ID of the discoverer in response to receiving the identity response message, receiving an proximity request validation response message in response to the proximity request validation message.

In one of the exemplary embodiments, the present disclosure is directed to a network entity, including at least but not limited to a transceiver module and a processing module coupled to the transceiver module. The transceiver is configured for transmitting and receiving data. The processing module is configured for at least but not limited to transmitting an identity request message comprising a network level user ID of a discoverer using the transceiver module, receiving an identity response message comprising an application layer user ID of the discoverer corresponding to the network level user ID of the discoverer using the transceiver module, transmitting a proximity request validation message of a D2D discovery comprising the application layer user ID of the discoverer using the transceiver module in response to receiving the identity response message, receiving an proximity request validation response message in response to the proximity request validation message using the transceiver module.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

In order to improve both privacy and system efficiency of the ProSe function (such as ProSe function A or ProSe function B described in FIG. 1 and FIG. 2), in one of exemplary embodiments of the present disclosure, a network entity such as a ProSe function would provide an application layer user ID (ALUID) of a discoverer UE (such as UE A in FIG. 1 and FIG. 2) to a discoveree UE (such as UE B in FIG. 1 and FIG. 2), wherein the ALUID of the discoverer UE is presented who make a proximity request. In addition, the ProSe function would also provide a validating response indicator such as a notification type indicating how to respond to the proximity request validation message in response to a validating operation performed by a user of the discoveree UE is not received. Accordingly, the user of the discoveree UE may know who make the D2D discovery, and the proximity request procedure would be preceded without stuckness. Reference will now be made to the present preferred embodiments of the disclosure, and it will be apparent to those skilled in the art that adjustments and applications can be correspondingly made to the following embodiments based on demands instead of being limited by the content in the following description.

Figure 3:
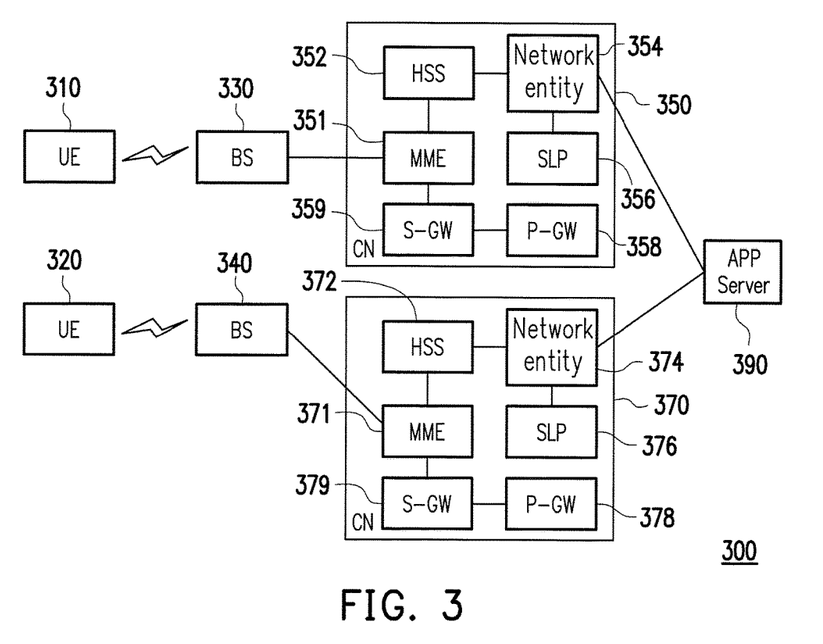
FIG. 3 is a schematic diagram illustrating a communication system in accordance with an embodiment of the present disclosure.

FIG. 3 is a schematic diagram illustrating a communication system in accordance with an embodiment of the present disclosure. Referring to FIG. 3, the communication system 300 could include but not limited to UEs 310 and 320, base stations (BSs) 330 and 340, core networks (CNs) 350 and 370, and a ProSe Application Server (APP server) 390.

The term "user equipment" (UE) such as UEs 310 and 320 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 4:
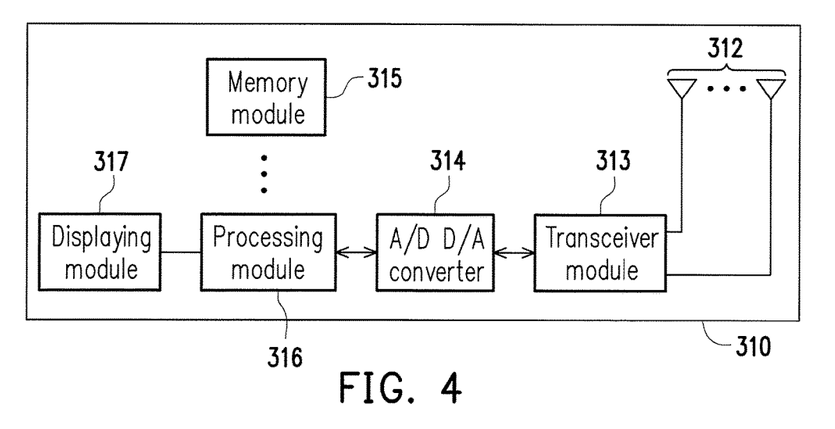
FIG. 4 illustrates an exemplary UE in accordance with an embodiment of the present disclosure.

A UE may be represented by at least the functional elements as illustrated in FIG. 4 in accordance with an embodiment of the present disclosure. The UE 310 may contain at least but not limited to a transceiver module 313, an analog-to-digital (A/D)/digital-to-analog (D/A) converter 314, a processing module 316, a displaying unit 317, optionally a memory module 315, and one or more antenna units 312. The transceiver module 313 transmits downlink signals and receives uplink signals wirelessly. The transceiver module 313 may also perform operations such as low noise amplifying, impedance matching, frequency mixing, up or down frequency conversion, filtering, amplifying, and so like. The (A/D)/(D/A) converter 314 is configured to convert from an analog signal format to a digital signal format during uplink signal processing and from a digital signal format to an analog signal format during downlink signal processing. The processing module 316 is configured to process digital signal and to perform procedures of the proposed D2D discovery method described in the following in accordance with exemplary embodiments of the present disclosure. Also, the processing module 316 may optionally be coupled to a non-transitory memory module 315 to store programming codes, device configurations, a codebook, buffered or permanent data, and so forth. The functions of the processing module 316 could be implemented by using programmable units such as a micro-processor, a micro-controller, a DSP chips, FPGA, etc. The functions of the processing module 316 may also be implemented with separate electronic devices or ICs, and the functions performed by the processing module 316 may be implemented within the domain of either hardware or software. The displaying unit 317 may be, for example, a liquid crystal display (LCD), an organic electro-luminescent display (OELD), or a plasma display panel (PDP), etc. The UE 320 may have a similar or the same functional elements of the UE 310, and therefore detailed descriptions for each element will not be repeated.

The term "base station" (BS) such as the BS 330 and 340 in this disclosure could represent various embodiments which for example could include but not limited to a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

The CNs 350 and 370 may be, for example, the, 2G CN such as GPRS core network, 3G CN, or 4G CN such as Evolved Packet Core (EPC). The CN 350 may contain at least but not limited to a mobility management entity (MME) 351, a Home Subscriber Server (HSS) 352, a network entity 354, a Secured User Plane Location Platform (SLP) 356, a Packet Data Network Gateway (P-GW) 358, and a Serving Gateway (S-GW) 359. The MME 351 is connected with the BS 330, the HSS 352, and the S-GW 359. The S-GW 359 is connected with the MME 351 and the P-GW 358. The network entity 354 is connected with the HSS 352, the SLP 356, and the APP server 390. Similarly, The CN 370 may contain at least but not limited to a MME 371, a HSS 372, a network entity 374, a SLP 376, a P-GW 378, and a S-GW 379. The coupling relation among the MME 371, the HSS 372, the network entity 374, the SLP 376, the P-GW 378, and the S-GW 379 could be referred to the coupling relation among the MME 351, the HSS 352, the network entity 354, the SLP 356, the P-GW 358, and the S-GW 359, and therefore detailed descriptions for each element will not be repeated.

Figure 5:
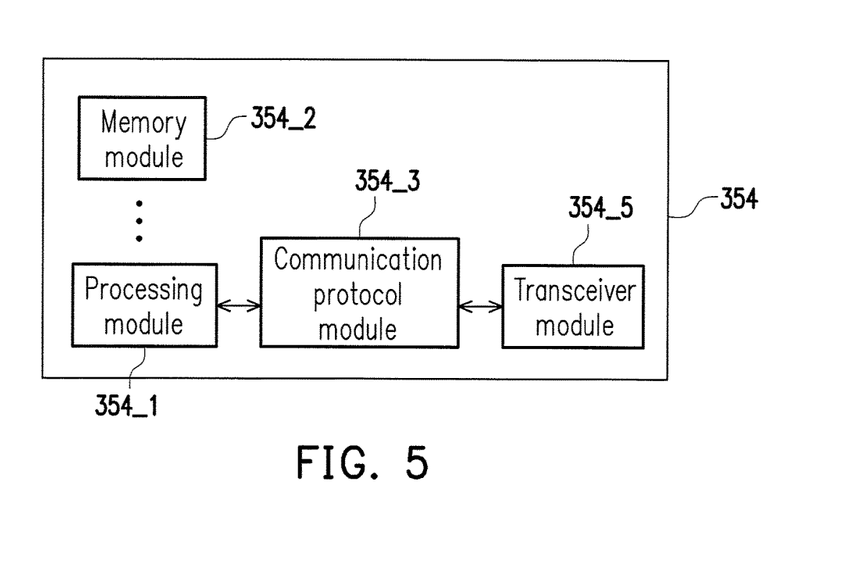
FIG. 5 illustrates an exemplary network entity in accordance with an embodiment of the present disclosure.

The exemplary network entities 354 and 357 could be ProSe Functions within an EPC network. A network entity may be represented by at least the functional elements as illustrated in FIG. 5 in accordance with an embodiment of the present disclosure. The network entity 354 would include at least but not limited to a processing module 354_1 coupled to a communication protocol module 354_3 which is coupled to a transceiver module 354_5. The transceiver module 354_5 is used for transmitting and receiving modulated signals which could be wireless RF signals, optical signals, or signals sent over a cable. The communication protocol module 354_3 could be independent from or an inherent part of the processing module 354_1 and would convert a digital message into a format that is compatible with various interfaces such as PC2, PC3, PC4, PC4x, and so forth. The processing module 354_1 is configured to process digital signal and to perform procedures of the proposed D2D discovery method described in the following in accordance with exemplary embodiments of the present disclosure. Also, the processing module 354_1 may optionally be coupled to a non-transitory memory module 354_2 to store programming codes, device configurations, a codebook, buffered or permanent data, a list of application that are authorized to use network assisted D2D discovery, and so forth. The functions of the processing module 354_1 could be implemented by using programmable units such as a micro-processor, a micro-controller, a DSP chips, FPGA, etc. The functions of the processing module 354_1 may also be implemented with separate electronic devices or ICs, and functions performed by the processing module 354_1 may also be implemented within the domains of either hardware or software. The network entity 374 may have a similar or the same functional elements of the network entity 354, and therefore detailed descriptions for each element will not be repeated.

It should be noticed that, the aforementioned communication system 300 is assumed that the UEs 310 and 320 are belonged to the different CNs such as the CNs 350 and 370, that means the UEs 310 and 320 transmit and receive data or messages through the CNs 350 and 370, respectively. In some other embodiment of the disclosure, the UEs 310 and 320 may located within a network coverage of the BS 330 (or the BS 340), and the UE 310 and 320 both transmit and receive data or messages through the CN 350 (or the CN 370).

Figure 6:
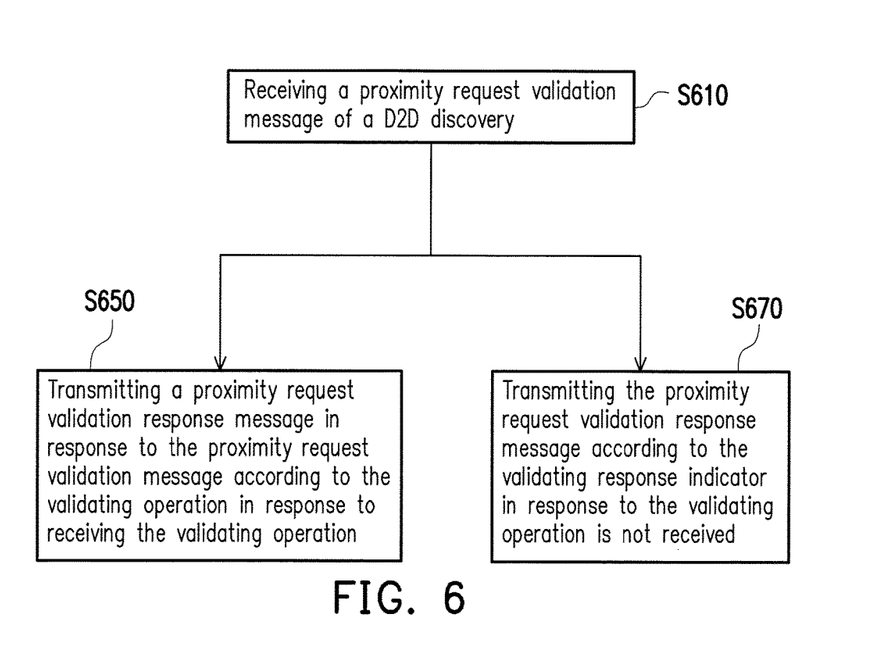
FIG. 6 is a flow chart illustrating a D2D discovery method of the UE in accordance with an embodiment of the present disclosure.

FIG. 6 is a flow chart illustrating a D2D discovery method of the UE 310 in accordance with an embodiment of the present disclosure. Referring to FIG. 6, in step S610, the processing module 316 of the UE 310 receives a proximity request validation message of a D2D discovery using the transceiver module 313, wherein the proximity request validation message comprises an application layer user ID (ALPID) of the discoverer and a validating response indicator. In this embodiment, the ALPID of the discoverer indicating who transmits a proximity request message, and the validating response indicator indicating how to respond to the proximity request validation message.

Specifically, according to the 3GPP TS 24.334, in a EPC-level ProSe discovery procedure, after a UE such as the UE 320 transmits a proximity request message for requesting the D2D discovery, the network entity 354 uses the proximity request validation procedure to request the UE 310 to confirm permission for the proximity request message. For example, a social network application is executed on the UE 320, and the UE 320 receives an operation for chatting with a friend such as a user of the UE 310. The network entity 354 may transmit the proximity request validation message to the UE 310 at the initiation of the proximity request validation procedure.

In this embodiment of the present disclosure, the proximity request validation message may be, for example, a Proximity Request Validation message which is consistent with 3GPP TS 23.303 and TS 24.334 or any other control signaling message for confirming a permission of the proximity request message of the UE 320. The proximity request validation message may contain at least but not limited to a session ID such as a transaction-ID, an application-ID, an ALUID of the UE 320 and an ALUID of the UE 310, a no responses timer, and the validating response indicator such as a notification type. The ALUID would identify a 3$^{rd}$ party application server platform, or the App Server 390 of FIG. 3. The no responses timer indicates an expired time of a timer of the UE 310, and the no responses timer may be configured to, for example, 5, 10, 30 seconds, etc. The validating response indicator may be an "allowed on no answer" indicator or a "denied on no answer" indicator. The detailed description of the no responses timer and the validating response indicator would be described later.

In an embodiment of the present disclosure, the processing module 316 may start the timer in response to the proximity request validation message is received, and determines whether the timer is expired. Specifically, the processing module 316 configures the expired time of the timer according to the no responses timer contained in the proximity request validation message, and starts the timer. Then, the processing module 316 may determine whether the timer is reached the expired time. It should be noticed that, the expired time of the time may be configured according to other control signaling message such as a PC3 Control Protocol messages or maintained by the network entity 354.

Then, the processing module 316 determines whether a validating operation in response to the proximity request validation message is received or not. In an embodiment of the present disclosure, the processing module 316 may display the ALUID of the discoverer on the displaying unit 317. The UE 310 may further comprise an input unit (not shown) such as a touch panel on the displaying unit 317, a button, a switch, etc. The processing module 316 may further display a notification diagram, wherein the notification diagram is used for providing a selection of accepting and rejecting the proximity request of the UE 320. Then, the input unit would detect whether the validating operation is received according to the selection. The UE 310 may determine the validating operation is received in response to the input unit detect that an input signal corresponding to the selection is received.

For example, a notification diagram with a user ID "Friend A", an accept button, and a reject button is displayed on the displaying unit 317, wherein the accept button and the reject button are respectively corresponding to accepting and rejecting the proximity request message of the UE 320. Then, the input unit detect whether a touch input corresponding to the accept button or the reject button is received, to determine the validating operation is received.

In step S650, the processing module 316 transmits a proximity request validation response message in response to the proximity request validation message using the transceiver module 313 according to the validating operation in response to receiving the validating operation. Specifically, the processing module 316 transmits the proximity request validation response message using the transceiver module 313 according to the validating operation in response to the timer is not expired and the validating operation is received. In other words, in response to the input unit detect that the input signal corresponding to the selection is received and the timer is not yet reached the expired time, the processing module 316 may determine the selection is to accept or reject the proximity request of the UE 320.

In response to the selection is to accept the proximity request of the UE 320, the processing module 316 may insert validating accept information into the proximity request validation response message. On the other hand, in response to the selection is to reject the proximity request of the UE 320, the processing module 316 may insert validating reject information into the proximity request validation response message. The proximity request validation response message may be, for example, a Proximity Request Validation Response message which is consistent with 3GPP TS 23.303 and TS 24.334 or any other control signaling message for responding to a permission of the proximity request of the UE 320. The validating accept information may be a "response-accept" element of the PROXIMITY_REQUEST_VALIDATION_RESPONSE message. The validating reject information may be a "response-reject" element of the PROXIMITY_REQUEST_VALIDATION_RESPONSE message. Then, the proximity request validation response message which is comprised the validating accept information or the validating reject information may be transmitted to the network entity 354 by the transceiver module 313.

In the other hand, in step S670, the processing module 316 transmits the proximity request validation response message using the transceiver module 313 according to the validating response indicator in response to the validating operation is not received. Specifically, the processing module 316 transmits the proximity request validation response message using the transceiver module 313 according to the validating response indicator in response to the timer is expired and the validating operation is not received. In response to the input unit does not detect that the input signal corresponding to the selection is received and the timer is reached the expired time, the processing module 316 may insert the validating accept information or the validating reject information into the proximity request validation response message according to the validating response indicator. In response to the validating response indicator is the "allowed on no answer" indicator, the processing module 316 may insert validating accept information into the proximity request validation response message. In response to the validating response indicator is the "denied on no answer" indicator, the processing module 316 may insert validating reject information into the proximity request validation response message. Then, the proximity request validation response message which is comprised the validating accept information or the validating reject information may be transmitted to the network entity 354 by the transceiver module 313.

Figure 7:
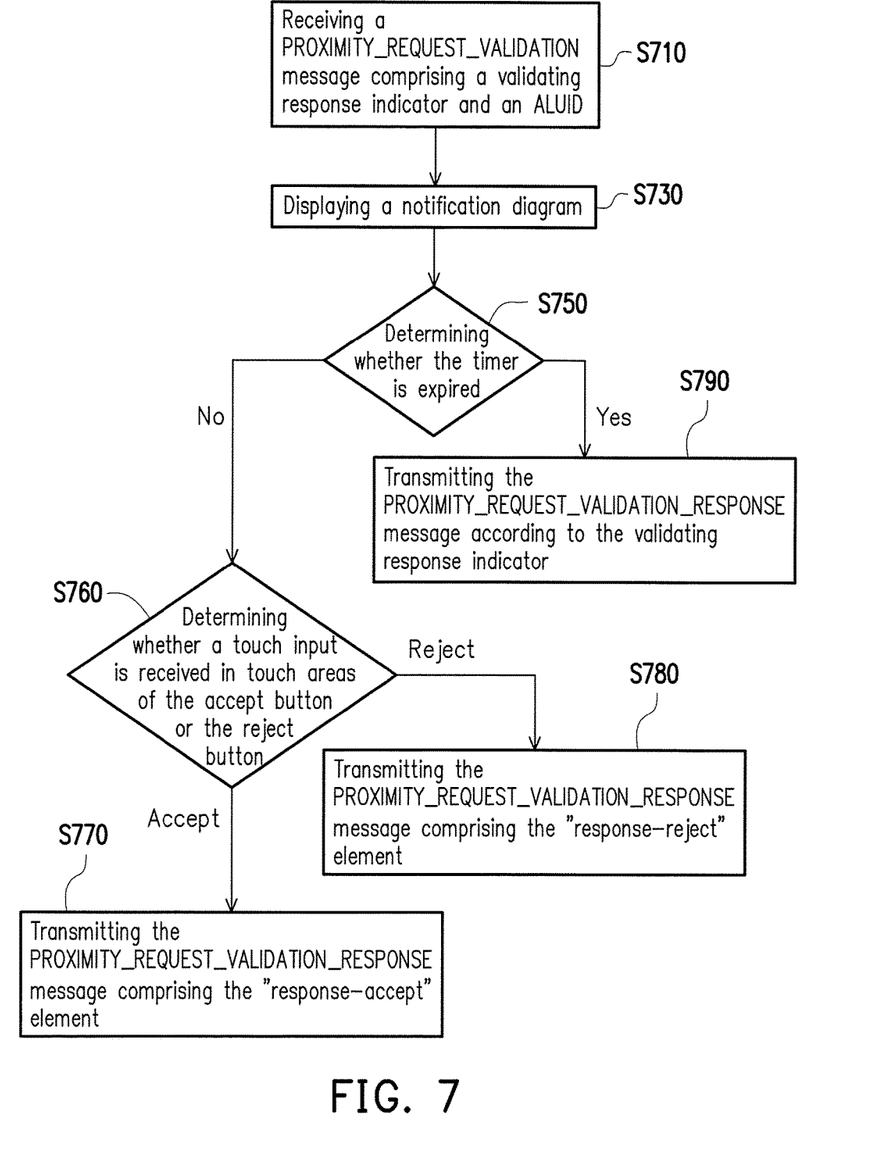
FIG. 7 is an example illustrating a D2D validating procedure of the UE in accordance with an embodiment of the present disclosure.

FIG. 7 is an example illustrating a D2D validating procedure of the UE 310 in accordance with an embodiment of the present disclosure. Assuming that the UE 320 make a proximity request. Referring to FIG. 7, in step S710, the UE 310 receives a PROXIMITY_REQUEST_VALIDATION message comprising a validating response indicator such as the "allowed on no answer" indicator or the "denied on no answer" indicator and an ALUID of the UE 310 from the network entity 354. A notification diagram with the ALUID of the UE 310, an accept button, and a reject button would be displayed on the displaying unit 317 (S730), and a timer is started. Then, the UE 310 determines whether the timer is expired (S750). If the timer is not expired, the UE 310 further determines whether a touch input is received in touch areas of the accept button or the reject button (S760). If the touch input is received in the touch areas of the accept button, the UE 310 would transmits a PROXIMITY_REQUEST_VALIDATION_RESPONSE message comprising the "response-accept" element (S770). If the touch input is received in the touch areas of the reject button, the UE 310 would transmits the PROXIMITY_REQUEST_VALIDATION_RESPONSE message comprising the "response-reject" element (S780). On the other hand, if the timer is expired, the UE 310 would transmit the PROXIMITY_REQUEST_VALIDATION_RESPONSE message according to the validating response indicator (S790).

Figure 8:
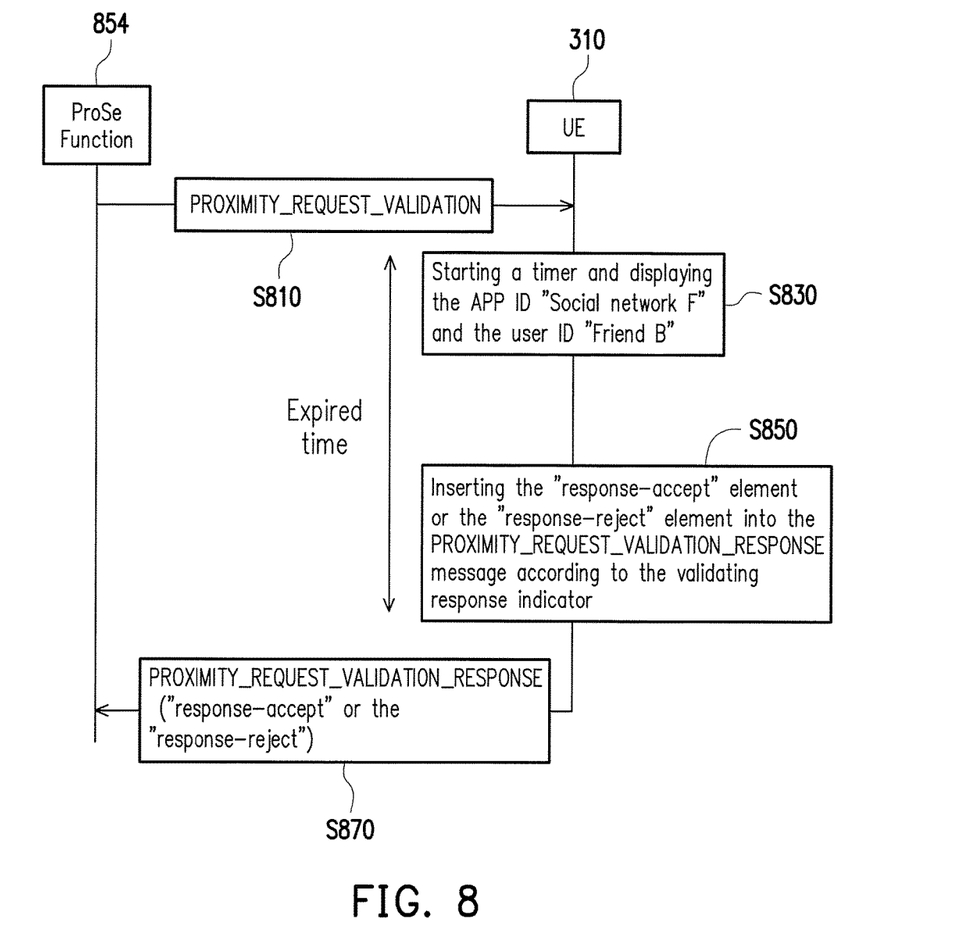
FIG. 8 illustrates a scenario of the proximity validation procedure in accordance with an embodiment of the present disclosure.

FIG. 8 illustrates a scenario of the proximity validation procedure in accordance with an embodiment of the present disclosure. In step S810, the ProSe function 854 transmits a PROXIMITY_REQUEST_VALIDATION message comprising an APP ID, the user ID of the discoverer such as the UE 320, a no responses timer, and a validating response indicator to the UE 310. The UE 310 starts a timer and displays the APP ID "Social network F" and the user ID "Friend B" on the displaying unit 317 (S830). When the timer is reached the expired time indicated by the no responses timer but the validating operation is not received, the UE 310 would insert the "response-accept" element or the "response-reject" element into the PROXIMITY_REQUEST_VALIDATION_RESPONSE message according to the validating response indicator (S850). Then, the UE 310 transmits the PROXIMITY_REQUEST_VALIDATION_RESPONSE message to the ProSe function 854.

Figure 9:
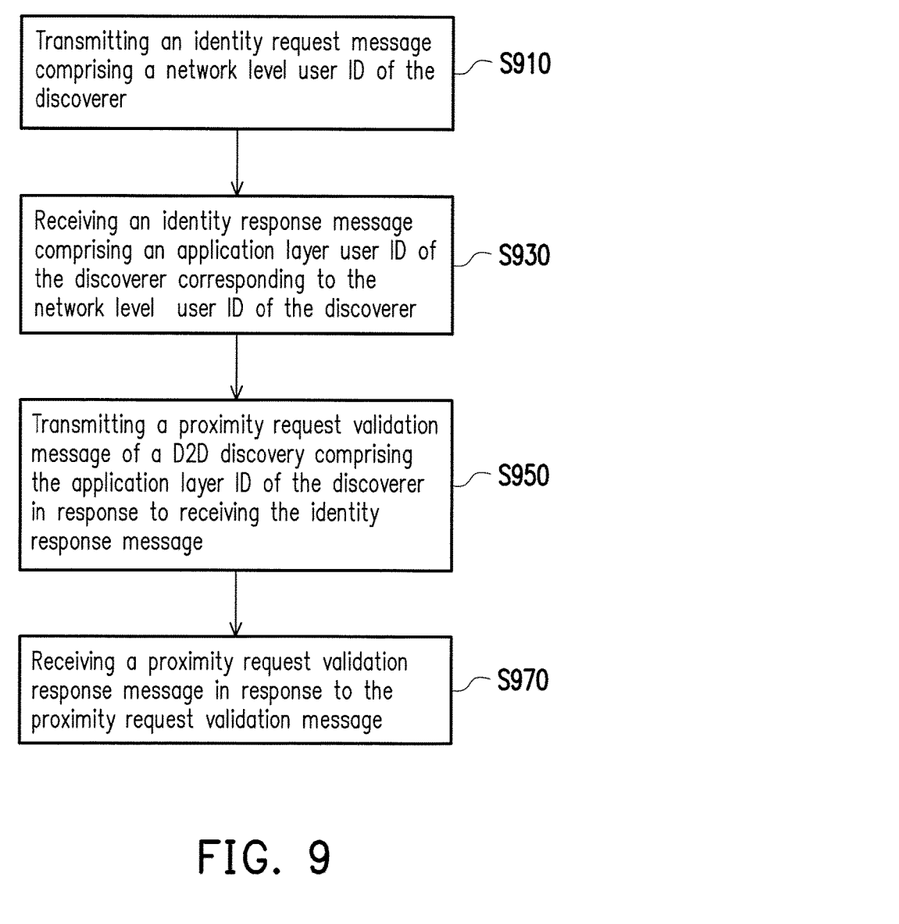
FIG. 9 is a flow chart illustrating a D2D discovery method of the network entity 354 in accordance with an embodiment of the present disclosure.

It should be noticed that, the application layer user ID of the discoverer such as ALUID of the UE 320 would be transmitted to the UE 310 by the network entity 354 in the aforementioned embodiments. The following description will be described how the network entity 354 obtains the ALUID of the discoverer. FIG. 9 is a flow chart illustrating a D2D discovery method of the network entity 354 in accordance with an embodiment of the present disclosure. Referring to FIG. 9, in step S910, the processing module 354_1 of the network entity 354 transmits an identity request message comprising a network level user ID of the discoverer using the transceiver module 354_5. For example, the identity request message may be a ProXimity-Action-Request (PXR) command comprising an EPC ProSe User ID (EPUID) of the UE 320, a Proximity MAP request message which is consistent with 3GPP TS 29.343 or any PC2 Control Protocol messages. The PXR command would be transmitted to the APP server 390. Then, the APP server 390 may perform a request map procedure by mapping the network level user ID of the discoverer with a database of the APP server 390, wherein the database comprises network level user ID of the discoverer such as EPC ProSe User IDs and the corresponding application layer user ID of the discoverers (such as application layer discoveree IDs, ALU-IDs of the discoverers) of subscribers of the APP server 390.

In step S930, the processing module 354_1 receives an identity response message comprising an application layer user ID of the discoverer corresponding to the network level user ID of the discoverer using the transceiver module 354_5. Specifically, in response to the APP server 390 finds that an application layer user ID of the discoverer is corresponding to the network level user ID of the discoverer comprised in the identity request message, the APP server 390 may transmit the identity response message comprising the corresponding application layer user ID of the discoverer to the network entity 354. For example, the identity response message may be a ProXimity-Action-Answer (PXA) command comprising an ALUID of the UE 320, a Proximity MAP response message which is consistent with 3GPP TS 29.343, or any PC2 Control Protocol messages.

In step S950, the processing module 354_1 transmits a proximity request validation message of a D2D discovery comprising the application layer ID of the discoverer using the transceiver module 354_5 in response to receiving the identity response message. In step S970, the processing module 354_1 receives a proximity request validation response message in response to the proximity request validation message using the transceiver module 354_5. The detailed description of the steps S950 and S970 could be referred to the steps S610, S650 and S670 of FIG. 6, and thus a repetition of descriptions will not be repeated.

Figure 10:
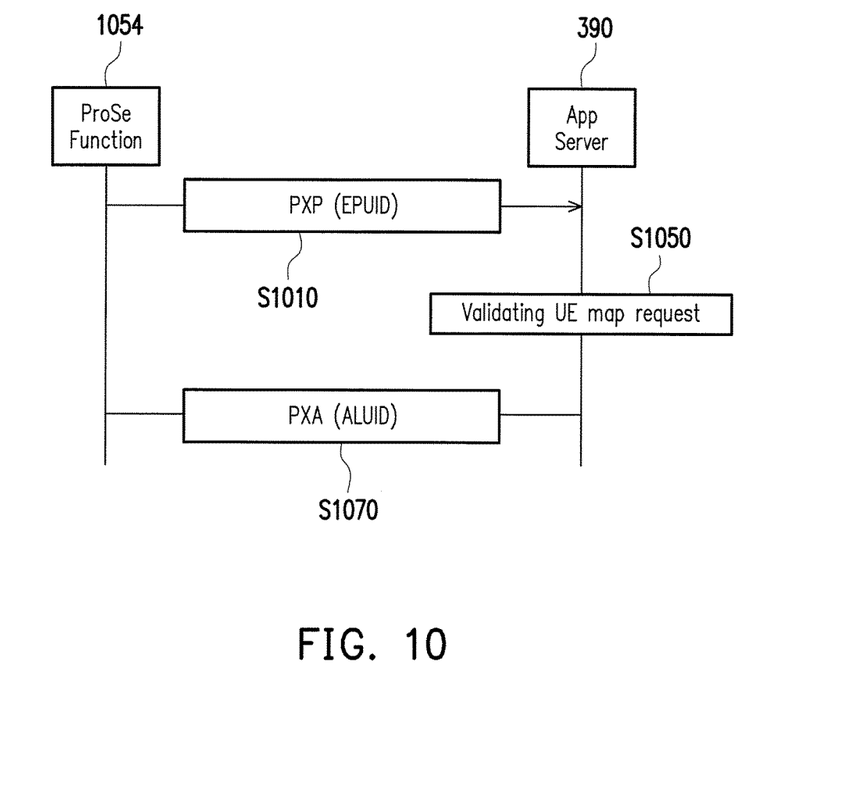
FIG. 10 illustrates a scenario of the proximity discovery procedure in accordance with an embodiment of the present disclosure.

FIG. 10 illustrates a scenario of the proximity discovery procedure in accordance with an embodiment of the present disclosure. In step S1010, the ProSe function 1054 transmits a PXR command comprising an EPUID of the UE 320. The APP server 390 validates UE map request according to the EPUID of the UE 320 (S1050). When the APP server 390 a corresponding ALUID is conformed to the EPUID of the UE 320, the APP server 390 would transmit a PXA command comprising the corresponding ALUID of the UE 320 to the ProSe function 1054.

In view of the aforementioned descriptions, the present disclosure provides solutions to the aforementioned issues. By providing the application layer user ID of the discoverer who initiates the proximity request to protect the user's privacy. By dealing with no response to the proximity request validation to improve the ProSe function's efficiency, wherein providing the proximity request validation response message based on the validating response indicator in response to no response to the proximity request validation. Accordingly, the efficiency of a communication system could also be increased.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A proximity request validating method applicable to a UE, the method comprising:
   receiving a proximity request validation message of a device to device (D2D) discovery, wherein the proximity request validation message comprises an application identifier (ID), an application layer user ID of a discoverer and a validating response indicator, wherein the validating response indicator indicates one of accepting and rejecting the proximity request validation message;
   transmitting a proximity request validation response message in response to the proximity request validation message according to a validating operation in response to receiving the validating operation, wherein the validating operation is corresponding to a selection for accepting and rejecting the proximity request validation message; and
   transmitting the proximity request validation response message according to the validating response indicator in response to the validating operation is not received.

2. The method according to claim 1, wherein receiving the proximity request validation message for validating the proximity discovery comprising:
   starting a timer in response to receiving the proximity request validation message; and
   determining whether the timer has expired.

3. The method according to claim 2, wherein transmitting the proximity request validation response message according to the validating response indicator in response to the validating operation is not received comprising:
   transmitting the proximity request validation response message according to the validating response indicator in response to the timer being expired and the validating operation not being received.

4. The method according to claim 2, wherein transmitting the proximity request validation response message in response to the proximity request validation message according to the validating operation in response to the validating operation being received comprising:
   transmitting the proximity request validation response message according to the validating operation in response to the timer being not expired and the validating operation being received.

5. The method according to claim 1, wherein receiving the proximity request validation message of the D2D discovery comprising:
   receiving the proximity request validation message comprising a no responses timer, wherein the no responses timer indicates an expired time of the timer.

6. The method according to claim 1, wherein the application layer user ID of the discoverer indicates an origin of a proximity request message.

7. The method according to claim 1, wherein the method further comprises:
   displaying the application layer user ID of the discoverer.

8. A user equipment (UE), comprising:
   a transceiver, transmitting and receiving wireless data; and
   a processor, coupled to the transceiver, and is configured for:
      receiving a proximity request validation message of a device to device (D2D) discovery by using the transceiver, wherein the proximity request validation message comprises an application ID, an application layer user ID of a discoverer and a validating response indicator, wherein the validating response indicator indicates one of accepting and rejecting the proximity request validation message;
      transmitting a proximity request validation response message in response to the proximity request validation message by using the transceiver according to a validating operation in response to receiving the validating operation, wherein the validating operation is corresponding to a selection for accepting and rejecting the proximity request validation message; and
      transmitting the proximity request validation response message using the transceiver according to the validating response indicator in response to the validating operation not being received.

9. The UE according to claim 8, the processor is further configured for:
   starting a timer in response to the receiving proximity request validation message; and
   determining whether the timer has expired.

10. The UE according to claim 9, the processor is further configured for:
    transmitting the proximity request validation response message by using the transceiver according to the validating response indicator in response to the timer being expired and the validating operation not being received.

11. The UE according to claim 9, the processor is further configured for:

transmitting the proximity request validation response message by using the transceiver according to the validating operation in response to the tinier not being expired and the validating operation being received.

12. The UE according to claim 8, the processor is further configured for:
receiving the proximity request validation message comprising a no responses timer, wherein the no responses timer indicates an expired time of the timer.

13. The UE according to claim 8, wherein the application layer user ID of the discoverer indicating an origin of the proximity request message.

14. The UE according to claim 8, further comprising:
a displaying unit, coupled to the processor, and the processor is further configured for:
displaying the application layer user ID of the discoverer on the displaying unit.

* * * * *